(12) United States Patent
Ogawa et al.

(10) Patent No.: US 8,410,365 B2
(45) Date of Patent: Apr. 2, 2013

(54) WIRE HARNESS AND METHOD OF INSTALLATION THEREOF

(75) Inventors: Tatsuo Ogawa, Kosai (JP); Masayuki Ikeno, Hamamatsu (JP); Junka Iwasaki, Hamamatsu (JP)

(73) Assignees: Yazaki Corporation, Tokyo (JP); Suzuki Motor Corporation, Shizuoka (JP)

( * ) Notice: Subject to any disclaimer, the term of this patent is extended or adjusted under 35 U.S.C. 154(b) by 160 days.

(21) Appl. No.: 12/881,347

(22) Filed: Sep. 14, 2010

(65) Prior Publication Data

US 2011/0061932 A1   Mar. 17, 2011

(30) Foreign Application Priority Data

Sep. 14, 2009   (JP) ................ 2009-211972

(51) Int. Cl.
*H02G 3/04* (2006.01)
(52) U.S. Cl. ............... 174/72 A; 174/40 CC; 174/72 C; 174/68.3; 248/70; 248/74.1; 248/74.2
(58) Field of Classification Search ............... 174/72 A, 174/40 CC, 72 C, 73.1, 88 R, 70 C, 95, 68.1, 174/68.3, 69; 248/68.1, 70, 74.1, 74.2, 74.3, 248/73, 49

See application file for complete search history.

(56) References Cited

U.S. PATENT DOCUMENTS

| | | | | | |
|---|---|---|---|---|---|
| 5,442,136 | A  * | 8/1995  | Allen        | .............. | 174/68.1 |
| 6,610,929 | B1 * | 8/2003  | Motokawa     | ............... | 174/72 A |
| 6,635,825 | B2 * | 10/2003 | Adachi       | .............. | 174/72 A |
| 6,700,064 | B2 * | 3/2004  | Aoki et al.  | .............. | 248/74.1 |
| 6,717,055 | B2 * | 4/2004  | Kato         | .............. | 174/72 A |
| 7,893,354 | B2 * | 2/2011  | Albert et al.| .............. | 174/72 A |
| 7,939,760 | B2 * | 5/2011  | Iwahara      | .............. | 174/72 A |
| 8,013,248 | B2 * | 9/2011  | Sakata et al.| .............. | 174/68.1 |

FOREIGN PATENT DOCUMENTS

JP   2002-324627 A   11/2002

* cited by examiner

*Primary Examiner* — Angel R Estrada
(74) *Attorney, Agent, or Firm* — Sughrue Mion, PLLC

(57) ABSTRACT

A wire harness includes a cable and a clamp. The cable has an end portion at which a connection terminal is provided. The connection terminal is electrically connected to a connecting portion. The clamp is attached with the cable so as to be movable with respect to the cable in a direction in which the cable extends. The clamp is fixed to a fixing portion disposed adjacent to the connecting portion in a state that the connection terminal is electrically connected to the connecting portion.

5 Claims, 7 Drawing Sheets

WIRE HARNESS AND METHOD OF INSTALLATION THEREOF

BACKGROUND

This invention relates to a wire harness used in a vehicle such as an automobile and also to a method of installation thereof.

A wire harness used in a vehicle such as an automobile is installed in such a condition that a predetermined portion of the wire harness in an extending direction thereof is fixed by a clamp. Connection terminals of this wire harness are electrically connected to a mating connecting portion such as a terminal block.

In a motor-mounted vehicle such as an electric car and a hybrid car, shielded cables each covered with an electrically-conductive sheath are used in a wire harness mounted therein, and the sheath is electrically connected to a mounting body connected to the ground, thereby preventing electromagnetic waves from leaking from the shielded cable to the exterior (see, Patent Document 1). Generally, the shielded cables each having a large diameter and high rigidity are used in the wire harness which is mounted in such an electric car, such a hybrid car or the like and through which a large current of a high voltage flows. Therefore, each of the shielded cables of such a wire harness has such characteristics that it is rigid and can not be easily bent.

Therefore, with respect to the construction in which the shielded cables are fixed by the clamp against movement in their extending direction, when the fixed portion of the shielded cables is disposed adjacent to one end portions of these shielded cables each having the connection terminal secured to the distal end thereof, much force and skill are required for bending the one end portions of the shielded cables so as to electrically connect the connection terminals to the mating terminal block (the connecting portion), since the one end portions are low in the degree of freedom and are short and has a high rigidity.

In the actual vehicle, however, those portions of the shielded cables near respectively to their one end portions are fixed to a fixing portion near to the connecting portion against movement in their extending direction so that the one end portions of the shielded cables each having the connection terminal secured to the distal end thereof will not have an extra length as much as possible, and thereafter each shielded cable is curved at the one end portion thereof so as to electrically connect the connection terminal to the connecting portion, and with this installation layout, the operation for connecting the connection terminal to the connecting portion could not be smoothly carried out.

[Patent Document 1] Japanese Patent Publication Number 2002-324627 A

SUMMARY

It is therefore one advantageous aspect of the present invention to provide a wire harness and a method of installation thereof, in which the wire harness can be easily installed in such a manner that a connection terminal can be easily connected to a connecting portion without being affected by an installation layout.

According to one aspect of the invention, there is provided a wire harness, comprising:

a cable having an end portion at which a connection terminal is provided, the connection terminal configured to be electrically connected to a connecting portion; and a clamp, attached with the cable so as to be movable with respect to the cable in a direction in which the cable extends, and configured to be fixed to a fixing portion disposed adjacent to the connecting portion in a state that the connection terminal is electrically connected to the connecting portion.

The wire harness may include a plurality of the cables which are attached with a gap between each other to the clamp.

The wire harness may be formed with a through hole through which the cable is inserted. An inner diameter of the through hole is larger than an outer diameter of the cable, so that the cable is slidable in the through hole.

According to another aspect of the invention, there is provided a method of installing a wire harness, the wire harness comprising a cable having an end portion at which a connection terminal is provided, and a clamp attached with the cable so as to be movable with respect to the cable in a direction in which the cable extends, the method comprising:

disposing the clamp at a first position away from the end portion;

connecting the connection terminal to a connecting portion after the disposing;

moving the clamp from the first position toward the end portion after the connecting; and fixing the clamp to a fixing portion disposed adjacent to the connecting portion, after the moving.

The method may further comprise a step of attaching the clamp to a plurality of the cables with a gap between each other.

DETAILED DESCRIPTION OF EXEMPLIFIED EMBODIMENTS

A preferred embodiment of the present invention will now be described with reference to the drawings.

Figure 1:
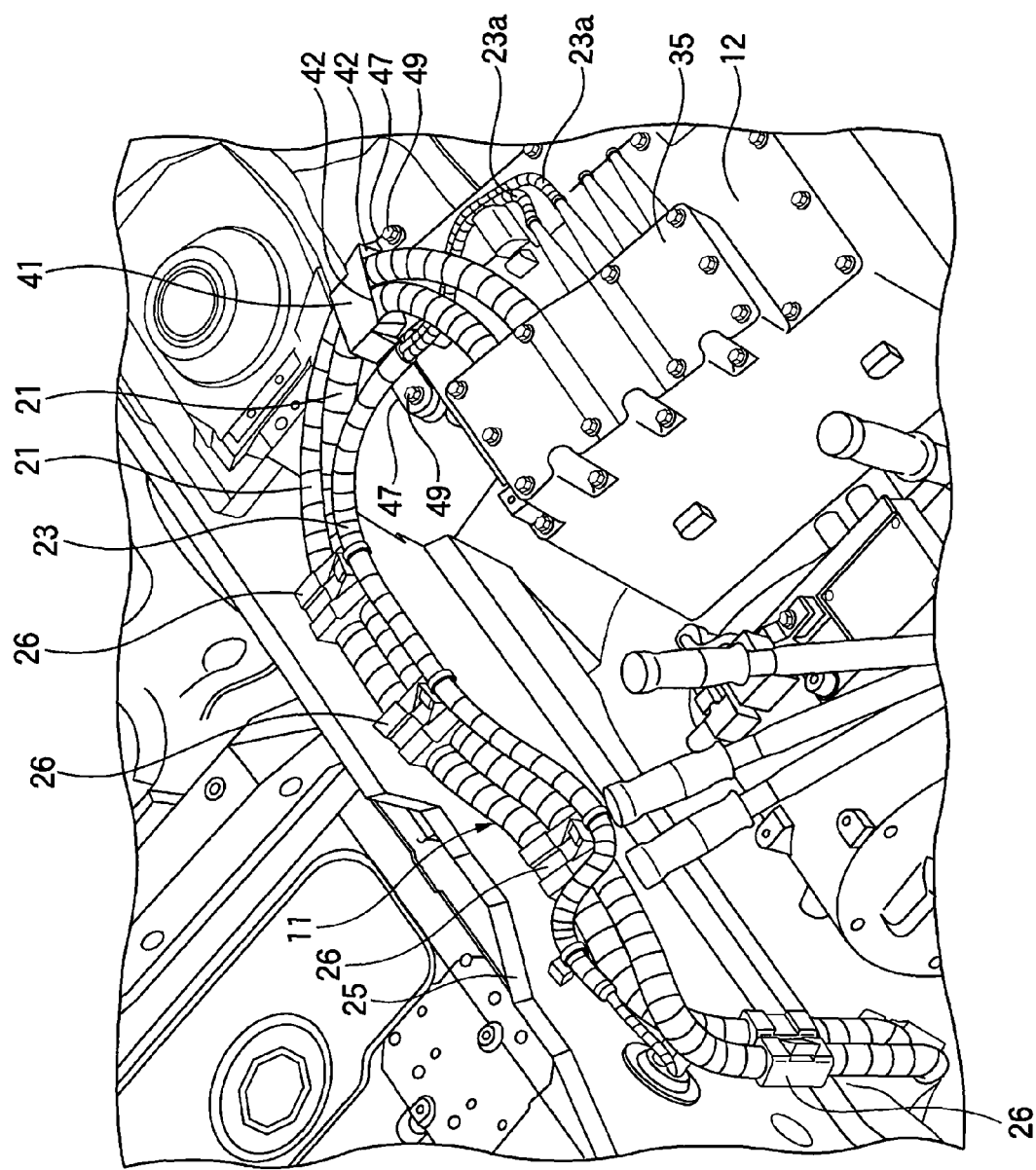
FIG. 1 is a perspective view of a wire harness according to one embodiment of the present invention.
Figure 2:
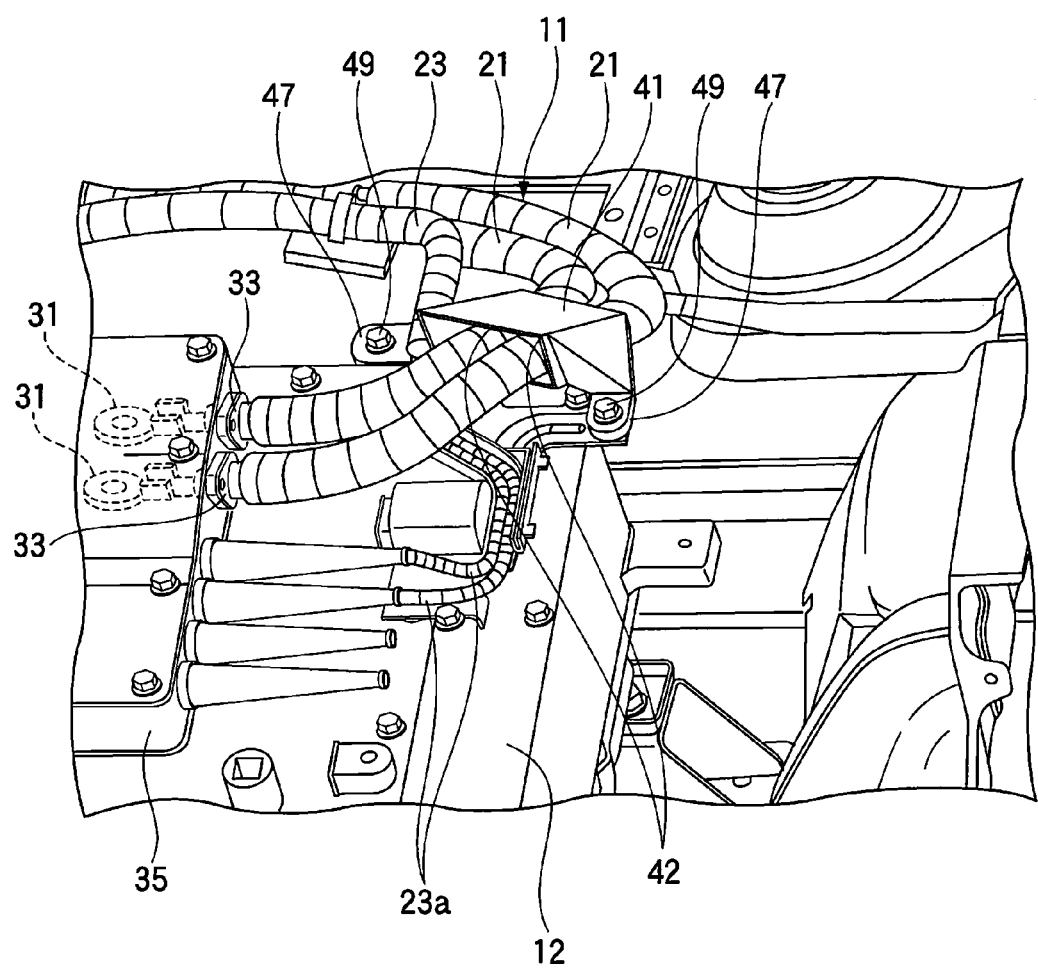
FIG. 2 is a perspective view of an end portion of the wire harness shown in FIG. 1 and vicinities thereof.
Figure 3:
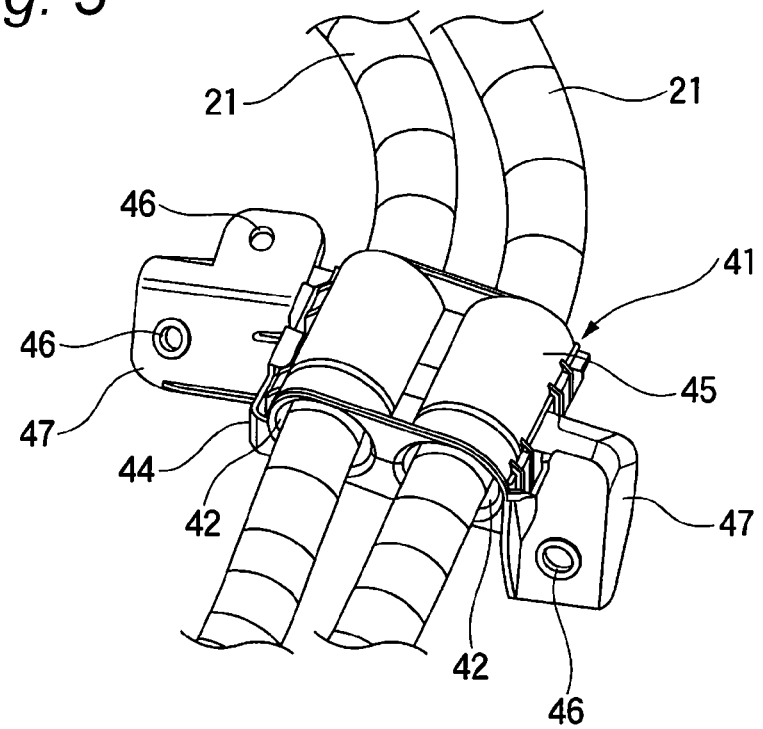
FIG. 3 is a perspective view of a power supply shielded cables to which a clamp of the wire harness shown in FIG. 1 is attached.
Figure 4:
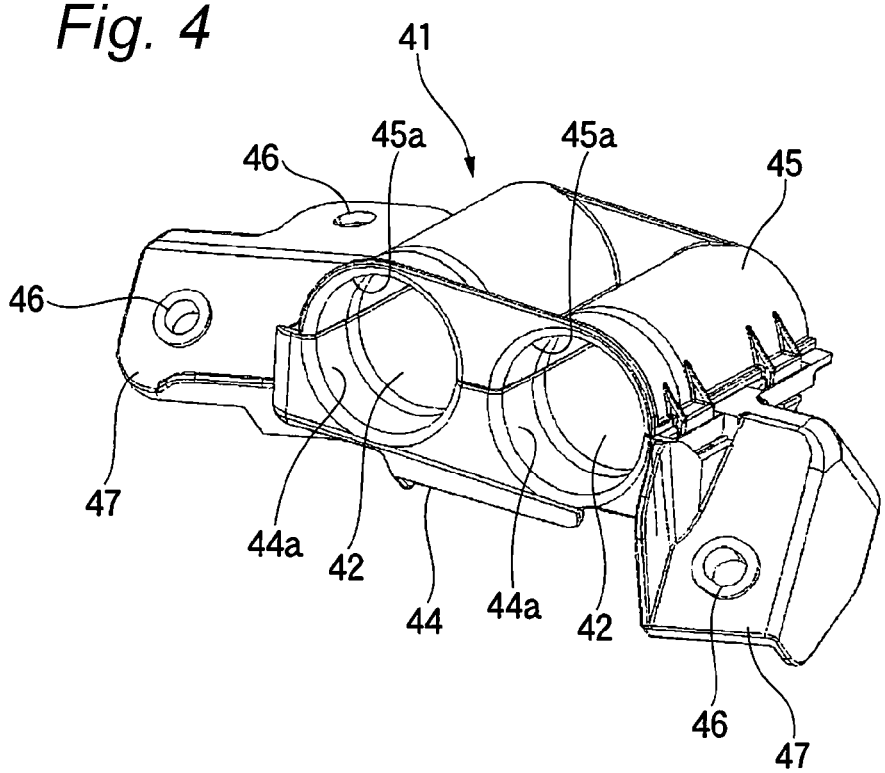
FIG. 4 is a perspective view of the clamp shown in FIG. 3 to be attached to the power supply shielded cables.

FIG. 1 is a perspective view explanatory of a wire harness of the present invention, showing a region where the wire harness is installed, FIG. 2 is a perspective view showing an end portion of shielded cables and vicinities thereof, FIG. 3 is a perspective view showing portions of the power supply shielded cables to which a clamp is attached, and FIG. 4 is a perspective view of the clamp to be attached to the power supply shielded cables.

As shown in FIGS. 1 and 2, the wire harness 11 is used in a vehicle such as an electric car and a hybrid car, and is electrically connected, for example, to a battery (not shown) and an inverter 12.

This wire harness 11 includes the plurality of power supply shielded cables (that is, cables) 21 which have a large diameter and high rigidity and through which a large current of a high voltage flows, and a signal feed shielded cable 23. The power supply shielded cables 21 and the signal feed shielded cable 23 are bundled together at their intermediate portions, and are fixed by fixing members 26 to a frame 25 of a vehicle body at a plurality of portions thereof spaced from each other in their extending direction. The extending direction can be reworded to a longitudinal direction of the power supply shielded cables 21 and the signal feed shielded cable 23.

Each of the power supply shielded cables 21 as well as the signal feed shielded cable 23 has such a structure that a conductor disposed at the center is covered at its outer periphery with a shielding layer (comprising a sheath) through an insulator, and an outermost periphery is covered with a covering member such as an adhesive tape.

The conductor and the shielding layer are exposed at one end portion of each power supply shielded cable 21, and a connection terminal 31 made of electrically-conductive metal is connected to the conductor, and a fixing ring 33 made of electrically-conductive metal is fixed to the shielding layer. Namely, the connection terminal 31 and the fixing ring 33 are provided at the distal end of the one end portion of the power supply shielded cable 21.

Figure 5:
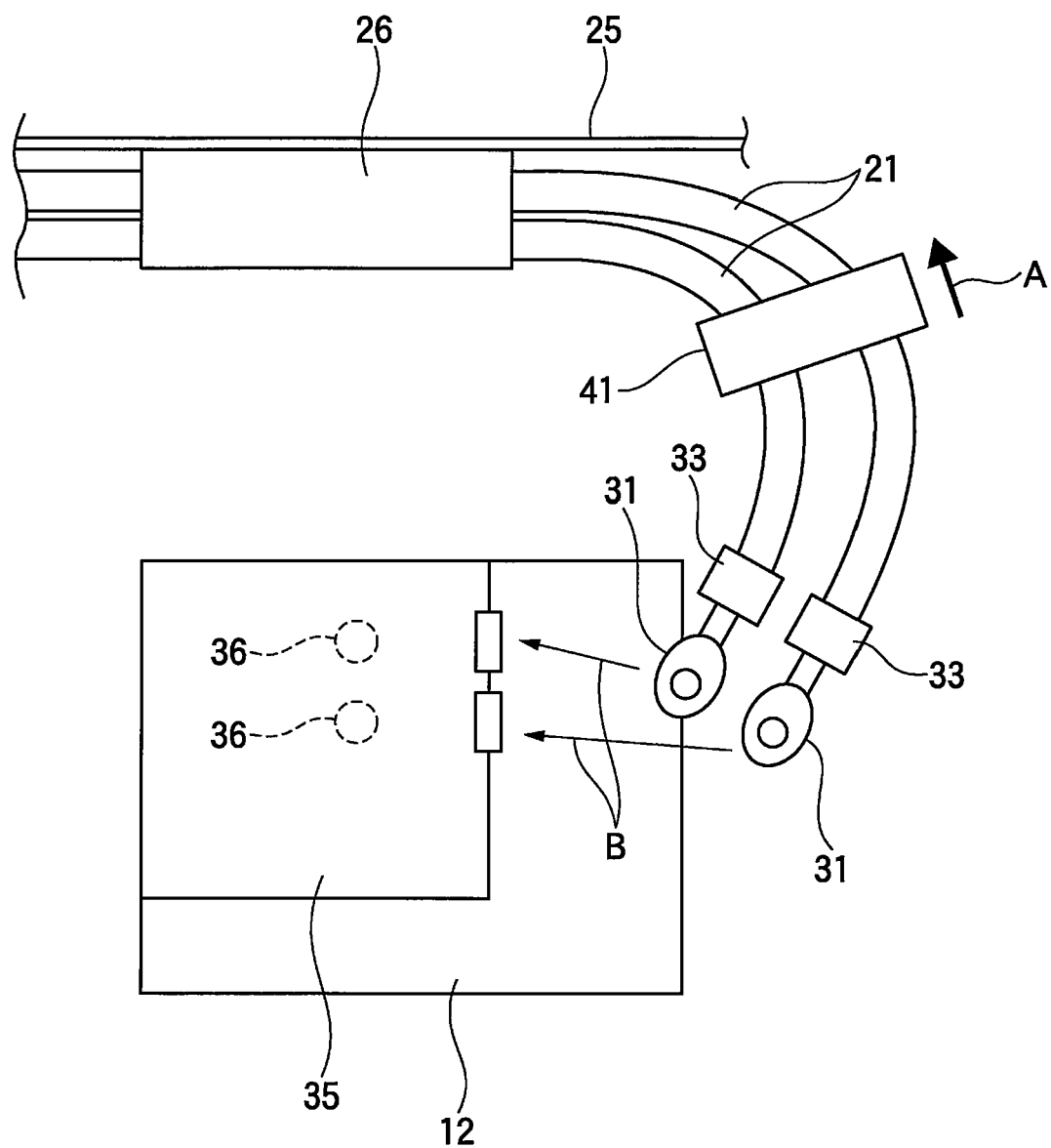
FIG. 5 is a first schematic plan view explanatory of a method of installing the wire harness shown in FIG. 1.

The connection terminals 31 connected to the respective power supply shielded cables 21 are inserted in a terminal box (a connecting portion) 35 of the inverter 12, and are electrically connected respectively to terminals 36 within the terminal box 35 as shown in FIG. 5. Also, the fixing rings 33 of the power supply shielded cables 21 are fixed and conductively connected to the terminal box 33 by screws (not shown). With this construction, the shielding layers of the power supply shielded cables 21 are conductively connected to the terminal box 35 connected to the ground, and therefore leakage of electromagnetic waves from the conductor to the exterior is prevented.

The signal feed shielded cable 23 is divided into two connection terminal portions 23a at a portion thereof disposed near to an end portion thereof, and is connected to the terminal box 35.

The clamp 41 is loosely fitted on the power supply shielded cables 21. As shown in FIGS. 3 and 4, this clamp 41 has through holes 42 spaced a predetermined distance from each other, and the power supply shielded cables 21 are passed respectively through these through holes 42.

The clamp 41 is molded of a synthetic resin, and includes a clamp body 44, and a cover 45 integrally attached to this clamp body 44. Concave portions 44a of an arcuate cross-section are formed in the clamp body 44, and also concave portions 45a of an arcuate cross-section are formed in the cover 45. When the cover 45 is attached to the clamp body 44 to be integrated therewith, the through holes 42 each defined by the concave portions 44a and 45a are formed.

Namely, by attaching the cover 45 to the clamp body 44 while placing the power supply shielded cables 21 respectively in the concave portions 44a, the clamp 41 is attached to the power supply shielded cables 21, so that the power supply shielding cables 21 are passed respectively through the through holes 42. As a result, the power supply shielded cables 21 are disposed to be spaced a predetermined distance from each other by the clamp 41.

An inner diameter of these through holes 42 is larger than an outer diameter of the power supply shielded cables 21, and when the power supply shielded cables 21 are passed through the respective through holes 42, the clamp 41 slidably holds the power supply shielded cables 21. Therefore, the clamp 41 can be moved with respect to the power supply shielded cables 21 in their extending direction.

Fixing piece portions 47 each having a hole 46 are formed at the clamp 41, and screws 49 are passed respectively through the holes 46 of the fixing piece portions 47, and are threaded respectively into screw holes (not shown) formed in the inverter 12, thereby fixing the clamp 41 to a predetermined portion of the inverter 12 (a fixing portion), as shown in FIG. 2.

With this arrangement, those portions of the power supply shielded cables 21 near respectively to their end portions are held by the clamp 41, fixed to the inverter 12, in spaced-apart relation to each other.

Next, the method of installing the above wire harness 11 will be described.

Figure 6:
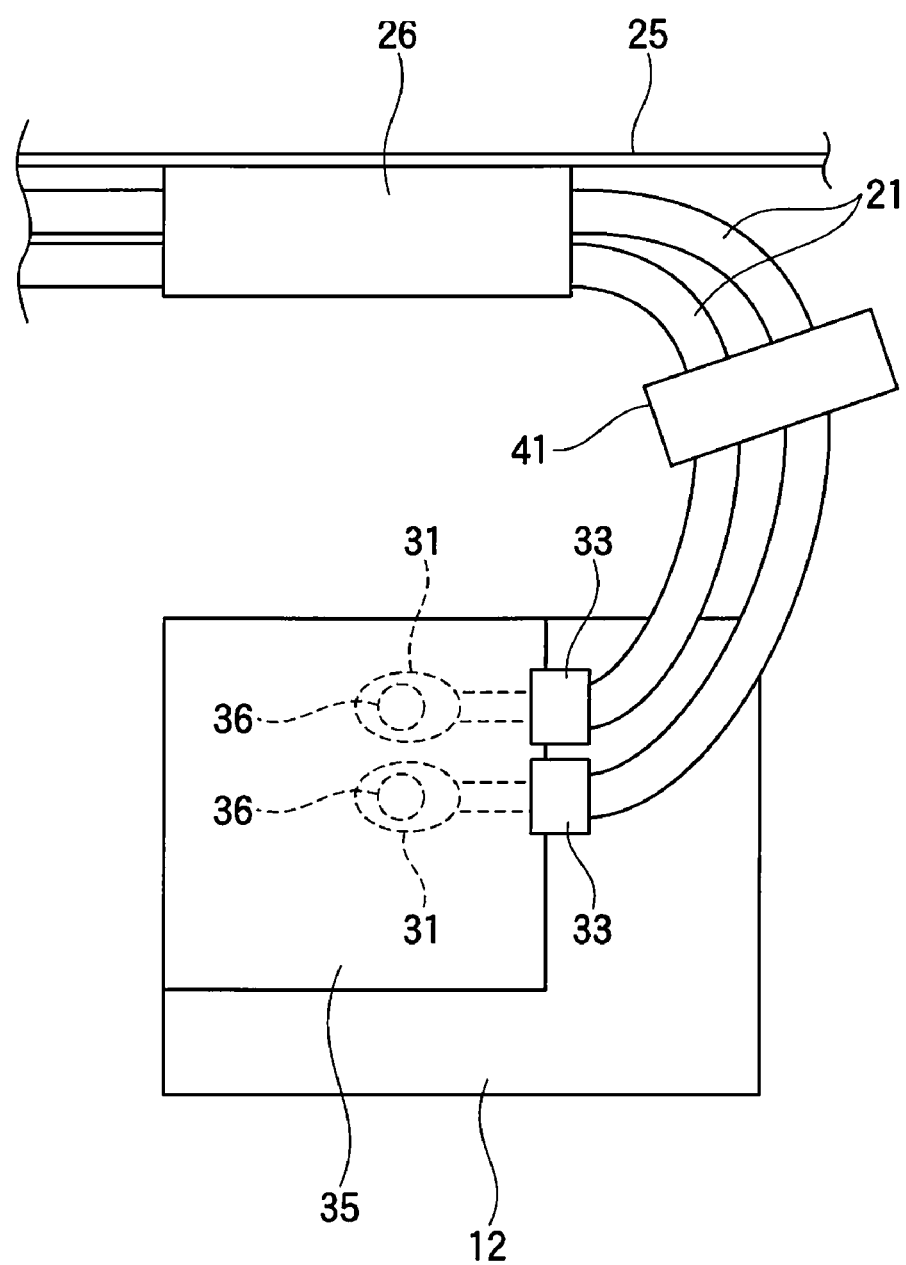
FIG. 6 is a second schematic plan view explanatory of the wire harness installation method shown in FIG. 1.
Figure 7:
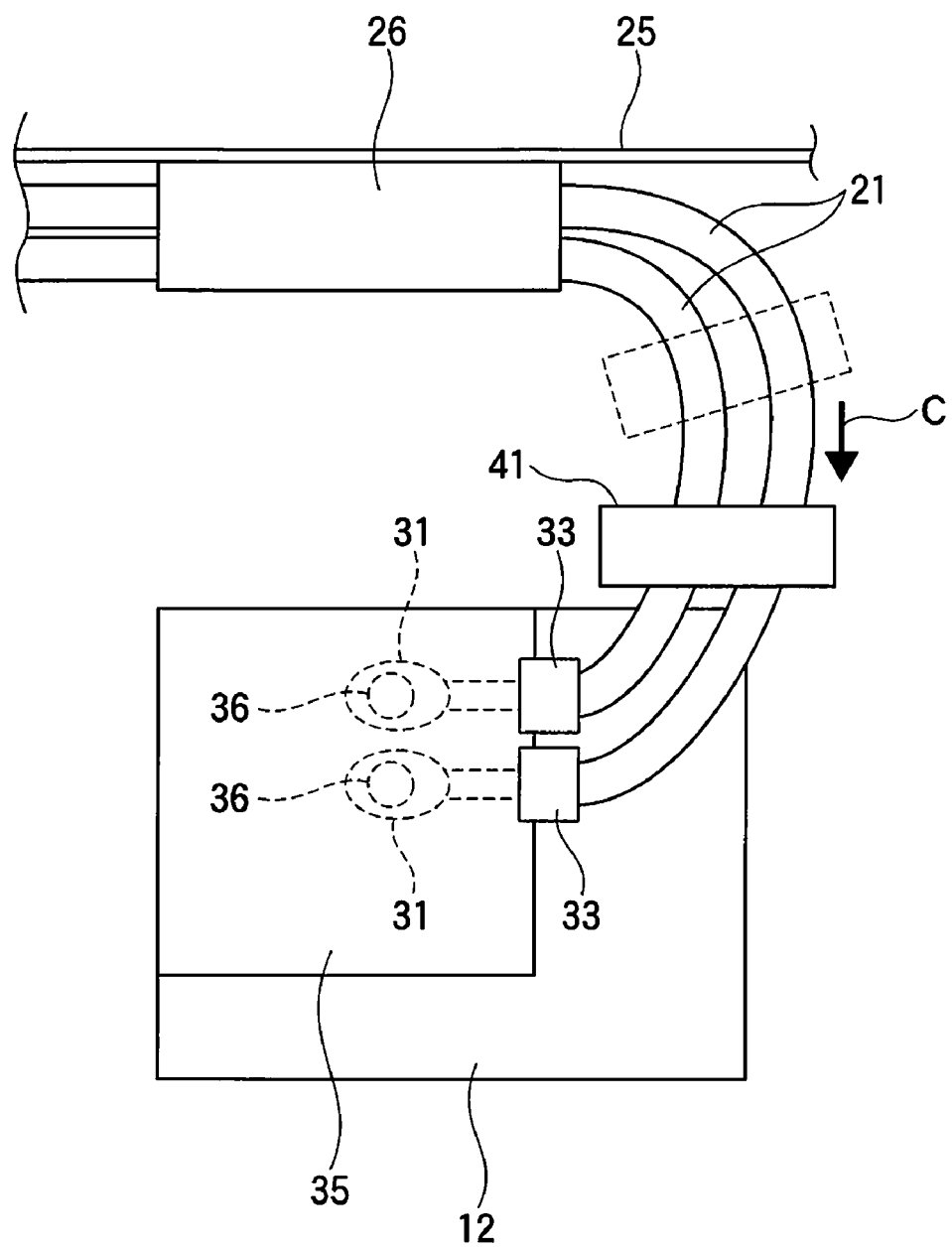
FIG. 7 is a third schematic plan view explanatory of the wire harness installation method shown in FIG. 1.

FIGS. 5 to 7 are schematic plan views explanatory of the wire harness installation method.

First, the plurality of portions of the wire harness 11 are fixed to the frame 25 of the vehicle body by the fixing members 26, and the clamp 41 is moved in a direction away from the position were the clamp 41 is to be fixed to the inverter 12, that is, in a direction of arrow A in FIG. 5 away from the connection terminals 31 secured respectively to the one end portions of the power supply shielded cables 21, toward the other end portions of the power supply shielded cables 21. The direction and is spaced apart from the connection terminals 31 as much as possible, as shown in FIG. 5.

Then, the one end portion of each power supply shielded cable 21 of the wire harness 11 is curved so as to insert the connection terminal 31 into the terminal box 35 of the inverter 12, and the connection terminal 31 is moved in a direction of arrow B in FIG. 5 toward the terminal box 35 of the inverter 12.

At this time, since the wire harness 11 is not yet fixed to the inverter 12 by the clamp 41, that portion of the wire harness 11 extending from the connection terminals 31 to the clamp 41 and including the one end portion thereof has a sufficient length that the connection terminals 31 can be inserted into the terminal box (the connecting portion) 35 of the inverter 12 to be electrically connected respectively to the terminals 36. Therefore, the worker can easily deform the one end portion of the wire harness 11 and the portion thereof near to this one end portion, and can smoothly effect the operation for inserting the connection terminals 31 into the terminal box 35.

Since the clamp 41 is spaced apart from the connection terminals 31 of the power supply shielded cables 21 as much as possible, a disadvantage that the clamp 41 interferes with the operation for connecting the connection terminals 31 to the terminal box 35 can be eliminated.

After the connection terminals 31 are inserted into the terminal box 35, and are connected respectively to the terminals 36 within the terminal box 35, the fixing rings 33 are fixed to the terminal box 35 by the screws, as shown in FIG. 6. By doing so, the power supply shielded cables 21 of the wire harness 11 are positively connected to the terminal box 35, and the shielding layers of these cables are conductively connected to the terminal box 35 connected to the ground.

Thereafter, as shown in FIG. 7, the clamp 41 so provided as to be moved along the power supply shielded cables 21 in the direction of extending of these power supply shielded cables 21 is moved in a direction of arrow C in FIG. 7 toward the inverter 12 that is toward the one end portions of the power supply shielded cables 21. And this clamp 41 is screw-fastened and fixed to the predetermined portion of the inverter 12 near to the terminal box 35 by the screws 49 as shown in FIG. 2.

As a result, the one end portions of the power supply shielded cables 21 connected to the terminal box 35 of the inverter 12, as well as the portions of the cables 21 near respectively to these one end portions, are held by the clamp 41 in spaced-apart relation to each other.

The connection terminal portions 23a of the signal feed shielded cable 23 are electrically connected to the terminal box 35 before or after the connection terminals 31 of the power supply shielded cables 21 are connected to the terminal box 35.

Figure 8:
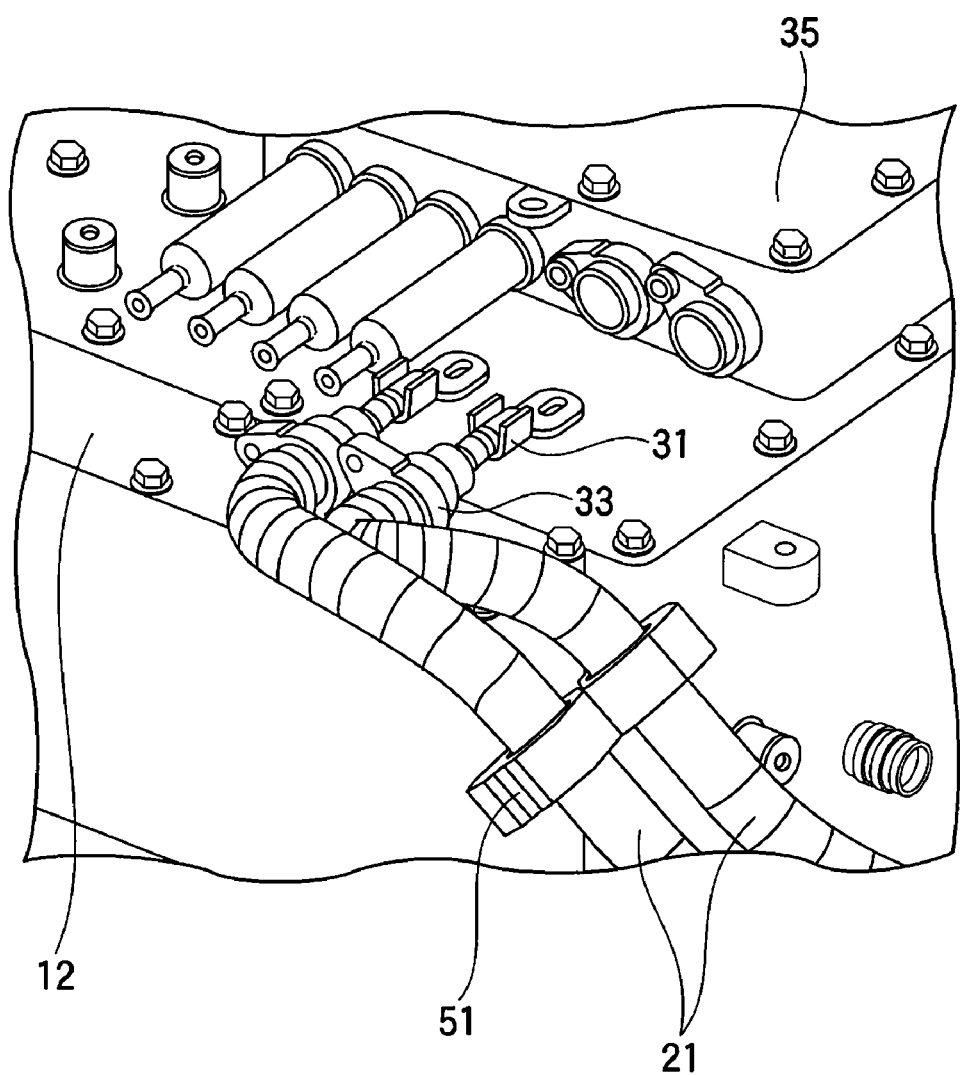
FIG. 8 is a perspective view showing an example of installation of a wire harness, in which a clamp is fixed to a predetermined portion of the power supply shielded cables near respectively to end portions thereof.

FIG. 8 shows an example of installation of a wire harness 11, in which a clamp 51 is fixed to predetermined portions of the power supply shielded cables 21 near respectively to one end portions thereof.

In this example, the clamp 51 is integrally fixed to the predetermined portions of the power supply shielded cables 21 near respectively to the one end portions thereof, and then the clamp 51 is fixed to the inverter 12, thereby fixing the power supply shielded cables 21 against movement in their extending direction, and thereafter the connection terminals 31 are electrically connected to the terminal box 35.

With this installation procedure, a sufficient length to bend the power supply shielded cables 21 so as to connect the connection terminals 31 to the terminal box 35 can not be secured.

Particularly in the installation layout in which the power supply shielded cables 21 having the large diameter and high rigidity are curved at their one end portions, the connecting operation for connecting the connection terminals 31 to the terminal box 35 can not be smoothly carried out.

As described above, when the wire harness or the wire harness installation method of this embodiment is adopted, the clamp 41 which is provided so as to be moved with respect to the power supply shielded cables 21 in the direction of extending of these power supply shielded cables 21 is first moved away from the one end portions of the power supply shielded cables 21 toward the other end portions thereof, and the connection terminals 31 of the power supply shielded cables 21 are connected to the terminal box 35, and thereafter the clamp 41 is moved toward the one end portions of the power supply shielded cables 21, and then the clamp 41 is fixed to the predetermined portion of the inverter 12, and by doing so, the power supply shielded cables 21 can be held in the predetermined position by the clamp 41. With this construction, the sufficient length to effect the operation for bending the power supply shielded cables 21 so as to connect the connection terminals 31 to the terminal box 35 can be secured.

Namely, the power supply shield cables 21 which are not fixed by the clamp 41 against movement in the extending direction thereof are held with the hand, and the operation for connecting the connection terminals 31 to the terminal box 35 is effected while smoothly curving the one end portions of the power supply shielded cables 21 and the portions thereof adjacent respectively to these one end portions (the one end portions and the adjacent portions being high in the degree of freedom), and after this connecting operation, the clamp 41 is fixed to the predetermined portion of the inverter 12. Thus, the connecting operation can be carried out easily, and the efficiency of the operation for installing the wire harness is markedly enhanced.

Furthermore, the clamp 41 can be moved with respect to the power supply shielded cables 21 in the direction of extending of the power supply shielded cables 21, and therefore as compared with the structure in which the power supply shielded cables 21 are fixed by the clamp 41 against movement in their extending direction, dimensional tolerances of the cable length, the fixed position of the clamp 41, etc., can be ignored, and the clamp 41 can be smoothly moved to be located at the predetermined portion of the inverter 12, and can be fixed thereto.

Particularly in the above wire harness 11, the plurality of power supply shielded cables 21 are installed to provide wiring, and thereafter the clamp 41 is moved to be fixed to the predetermined portion of the inverter 12, and by doing so, the plurality of power supply shielded cables 21 can be held in spaced-apart relation to each other in the predetermined position where the clamp 41 is fixed.

Although the present invention has been shown and described with reference to specific preferred embodiments, various changes and modifications will be apparent to those skilled in the art from the teachings herein. Such changes and modifications as are obvious are deemed to come within the spirit, scope and contemplation of the invention as defined in the appended claims.

For example, in the above embodiment, although the clamp 41 is mounted on the two power supply shielded wires 21 so as to be moved in their extending direction, the number of the cables held by the clamp 41 is not limited to two. Therefore, the number of cables may be one or more than two.

The disclosures of Japanese Patent Application No. 2009-211972 filed Sep. 14, 2009 including specification, drawings and claims is incorporated herein by reference in its entirety.

In the present invention, there can be provided the wire harness and the method of installation thereof, in which the wire harness can be easily installed in such a manner that the connection terminal can be easily connected to the connecting portion without being affected by the installation layout.

What is claimed is:

1. A wire harness, comprising:
   a cable having an end portion at which a connection terminal is provided, the connection terminal configured to be electrically connected to a connecting portion; and
   a clamp, attached with the cable so as to be movable with respect to the cable in a direction in which the cable extends so that the cable is slideable in the clamp, and configured to be fixed to a fixing portion disposed adjacent to the connecting portion in a state that the connection terminal is electrically connected to the connecting portion.

2. The wire harness according to claim 1, wherein:
   the wire harness includes a plurality of the cables, and
   the cables are attached with a gap between each other to the clamp.

3. The wire harness according to claim 1, wherein:
   the wire harness is formed with a through hole through which the cable is inserted, and
   an inner diameter of the through hole is larger than an outer diameter of the cable, so that the cable is slidable in the through hole.

4. A method of installing a wire harness, the wire harness comprising a cable having an end portion at which a connection terminal is provided, and a clamp attached with the cable so as to be movable with respect to the cable in a direction in which the cable extends, the method comprising:
   disposing the clamp at a first position away from the end portion;
   connecting the connection terminal to a connecting portion after the disposing;
   moving the clamp along the cable from the first position toward the end portion after the connecting; and
   fixing the clamp to a fixing portion disposed adjacent to the connecting portion, after the moving.

5. The method according to claim 4, further comprising:
   attaching the clamp to a plurality of the cables with a gap between each other.

* * * * *